(12) United States Patent
Norton

(10) Patent No.: US 6,256,923 B1
(45) Date of Patent: Jul. 10, 2001

(54) FISH HANDLING PLIERS

(75) Inventor: Don S. Norton, Clinton, MS (US)

(73) Assignee: United Plastic Molders, Inc., Jackson, MS (US)

( * ) Notice: Subject to any disclaimer, the term of this patent is extended or adjusted under 35 U.S.C. 154(b) by 0 days.

(21) Appl. No.: 09/512,795

(22) Filed: Feb. 25, 2000

(51) Int. Cl.[7] .......................... A01K 97/14; A01K 77/00
(52) U.S. Cl. ........................ 43/4; 81/367; 81/372
(58) Field of Search .................. 43/4, 5, 53.5, 1; 81/367, 372; 294/16, 28, 104, 50.9

(56) References Cited

U.S. PATENT DOCUMENTS

| | | |
|---|---|---|
| D. 254,563 | 3/1980 | Nihizer ............................ D22/150 |
| D. 307,788 | 5/1990 | Mattson .......................... D22/150 |
| 2,478,728 * | 8/1949 | Ward et al. ......................... 81/367 |
| 2,653,844 | 9/1953 | Detwiler ............................ 294/118 |
| 3,012,360 * | 12/1961 | Creel et al. ........................ 43/53.5 |
| 3,106,035 | 10/1963 | Tennyson ........................... 43/53.5 |
| 3,405,963 * | 10/1968 | Neely .................................. 294/16 |
| 3,657,948 * | 4/1972 | Myers ................................. 81/367 |
| 3,675,359 * | 7/1972 | Ohno ................................. 43/53.5 |
| 3,710,658 * | 1/1973 | Wilson ................................ 81/367 |
| 3,859,874 * | 1/1975 | Joeckel ............................... 81/367 |
| 4,297,756 * | 11/1981 | Lance ................................. 81/367 |
| 4,318,316 * | 3/1982 | Guilliams ........................... 81/367 |
| 4,499,797 * | 2/1985 | Wilson ................................ 81/367 |
| 4,541,312 * | 9/1985 | Petersen ............................. 81/367 |
| 4,559,853 | 12/1985 | Oye .................................... 81/420 |
| 4,563,833 | 1/1986 | Aucoin ................................ 43/54.1 |
| 4,709,601 * | 12/1987 | Petersen ............................. 81/367 |
| 4,965,954 | 10/1990 | Cavazos .................................. 43/4 |
| 5,007,312 * | 4/1991 | Bailey ................................. 81/367 |
| 5,052,251 | 10/1991 | Mills .................................. 81/324 |
| 5,092,074 | 3/1992 | Zincke ............................... 43/53.5 |
| 5,119,585 | 6/1992 | Camp ................................ 43/53.5 |
| 5,207,014 * | 5/1993 | Panella ................................... 43/4 |
| 5,469,765 * | 11/1995 | Franklin ............................. 81/367 |
| 5,469,766 * | 11/1995 | Hodges .............................. 81/367 |
| 5,503,049 * | 4/1996 | Chervenak et al. ................ 81/367 |
| 5,595,100 * | 1/1997 | Sollo .................................. 81/367 |
| 5,784,830 * | 7/1998 | Brumfield ......................... 43/53.5 |
| 5,813,297 * | 9/1998 | Zepkowski ......................... 81/367 |

* cited by examiner

*Primary Examiner*—Darren W. Ark
(74) *Attorney, Agent, or Firm*—Nixon & Vanderhye P.C.

(57) ABSTRACT

Fish handling pliers are stabilized against lateral movements of the pliers jaws. More specifically, the fish handling pliers of the present invention include an upper member having an upper handle section at a rearward end thereof, and an upper jaw at a forward end thereof. A lower member has a lower jaw at a forward end thereof which is opposed to the upper jaw of the upper member. The lower member also has a rearward end pivotally connected to the upper member to allow for pivotal movements of the lower member towards and away from the upper member to thereby close and open the opposed upper and lower jaws, respectively. Importantly, one of the upper and lower members defines a lengthwise-extending groove. The other of the upper and lower members includes a lengthwise extending tongue in opposition to the groove. The tongue is thus seated within the groove when said upper and lower jaws are closed thereby stabilizing the upper and lower members, and hence their respective upper and lower jaws, against lateral movements. Most preferably, the upper member includes the groove, while the lower member includes the tongue.

11 Claims, 5 Drawing Sheets

FISH HANDLING PLIERS

FIELD OF THE INVENTION

Figure 1:
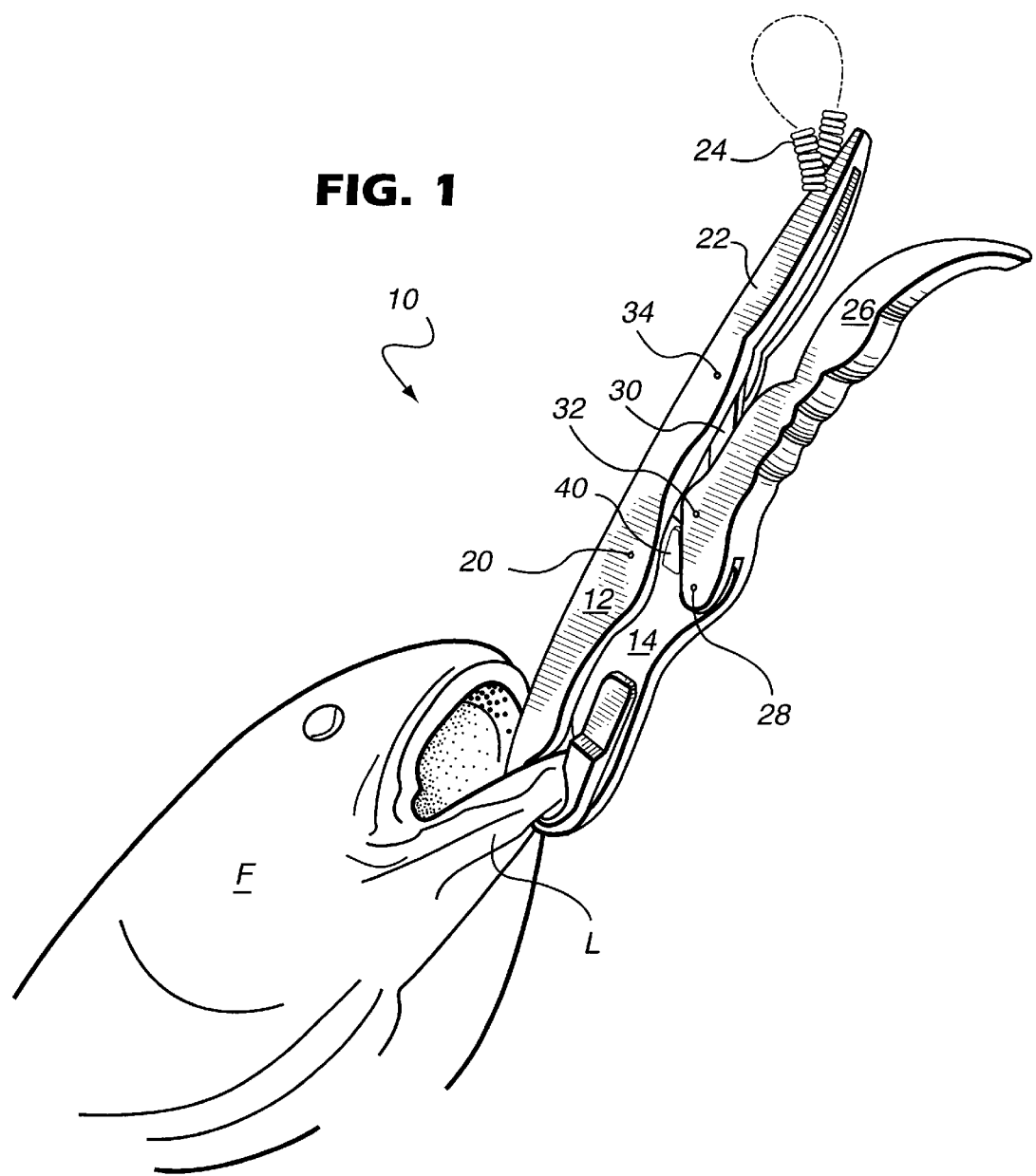

The present invention relates generally to fish gripping and handling tools. More specifically, the present invention relates to pliers which are especially adapted to grip the lower lip of a fish.

BACKGROUND AND SUMMARY OF THE INVENTION

A variety of pliers are known in the art which are capable of gripping the lip of a fish and, in so doing, assist fishermen in the handling of the fish, as evidenced by the following prior-issued U.S. Pat. No. 2,653,844 to Detwiler; U.S. Pat. No. 3,106,035 to Tennyson; U.S. Pat. No. 4,559,853 to Oye; U.S. Pat. No. 4,563,833 to Aucoin; U.S. Pat. No. 4,965,954 to Cavazos; U.S. Pat. No. 5,092,074 to Zincke; U.S. Pat. No. 5,119,585 to Camp; Des. U.S. Pat. No. 254,563 to Nihizer; and Des. U.S. Pat. No. 307,788 to Mattson. While such prior proposals for fish handling pliers are suitable for their intended purpose, improvements are still needed.

In order to be useful, fish gripping pliers must, of course, securely grip the fish's lower lip. At the same time, however, the grip exerted on the fish's lower lip must be sufficiently gentle to minimize (or prevent entirely) substantial injury from occurring while the fish is being handled (e.g., so as to remove fish hooks). This secure, yet gentle, gripping function is even more important for the fisherman who intends to release his catch. As might be envisioned, a fish being handled out of water fights desperately against the grip of the pliers. As a result, substantial lateral or side-to-side forces are exerted on the jaws of the pliers which can cause sever abrasion or tearing of the fish's lip.

It would therefore be highly desirable if fish handling pliers were provided which exerted a secure, yet gentle, gripping force on the fish's lip while minimizing (if not preventing entirely) injury to the fish that may result from lateral forces being applied to the pliers. It is towards fulfilling such a need that the present invention is directed.

Broadly, the present invention is embodied in fish handling pliers which are stabilized against lateral movements of the pliers jaws. More specifically, according to the present invention, the fish handling pliers of the present invention include an upper member having an upper handle section at a rearward end thereof, and an upper jaw at a forward end thereof. A lower member has a lower jaw at a forward end thereof which is opposed to the upper jaw of the upper member. The lower member also has a rearward end pivotally connected to the upper member to allow for pivotal movements of the lower member towards and away from the upper member to thereby close and open the opposed upper and lower jaws, respectively.

Importantly, one of the upper and lower members defines a lengthwise-extending groove. The other of the upper and lower members includes a lengthwise extending tongue in opposition to the groove. The tongue is thus seated within the groove when said upper and lower jaws are closed thereby stabilizing the upper and lower members, and hence their respective upper and lower jaws, against lateral movements. Most preferably, the upper member includes the groove, while the lower member includes the tongue.

The fish pliers of the present invention advantageously have a lower handle section in opposition to the upper handle section which is pivotally connected to said lower member. A toggle lever may be pivotally connected at one end thereof to the lower handle section rearwardly of the pivotal connection between the lower member and the lower handle section. The opposite end of the toggle lever may be pivotally connected to the upper handle section so as to provide an over-the-center locking assembly.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2A:
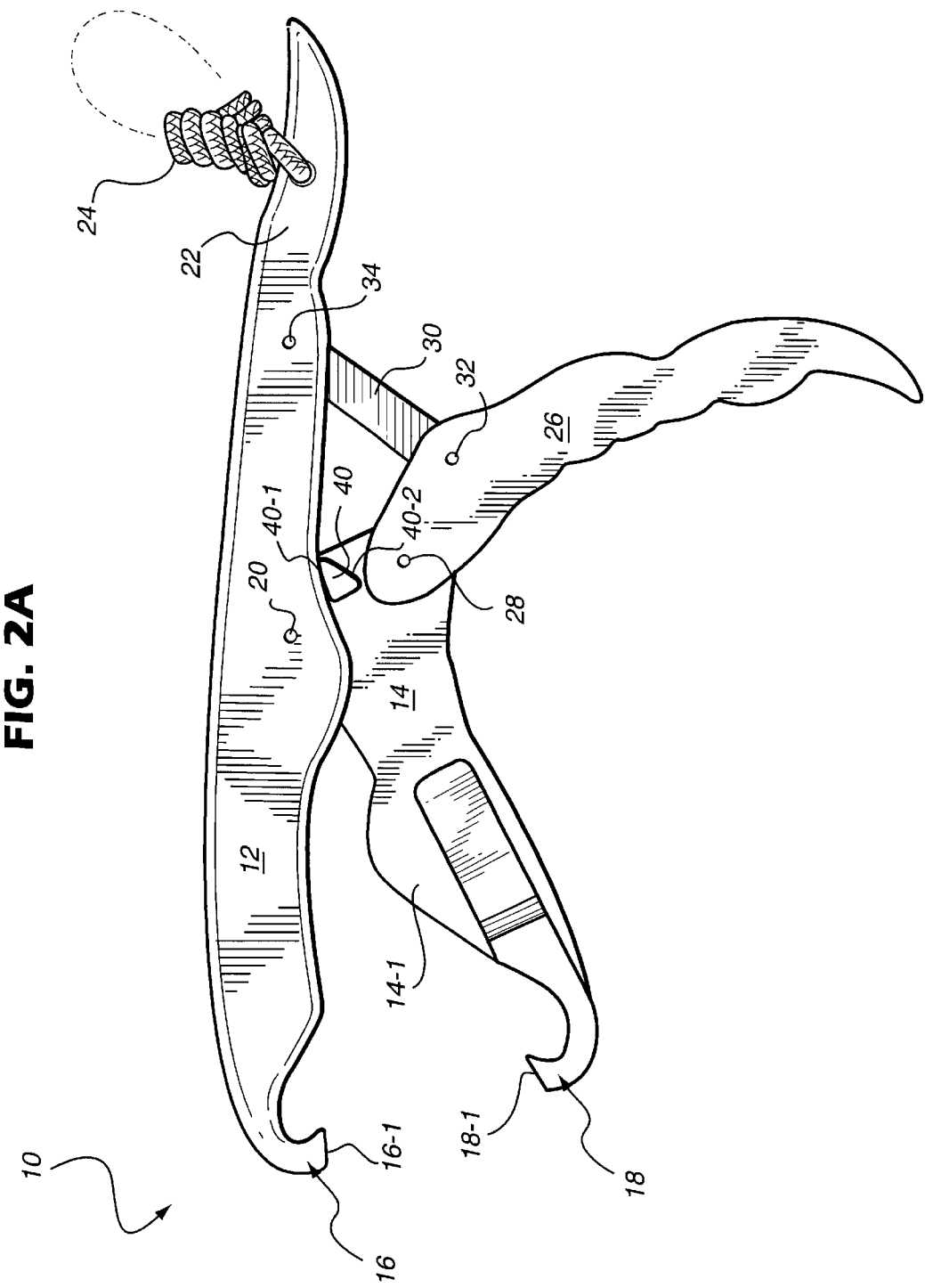
Figure 2B:
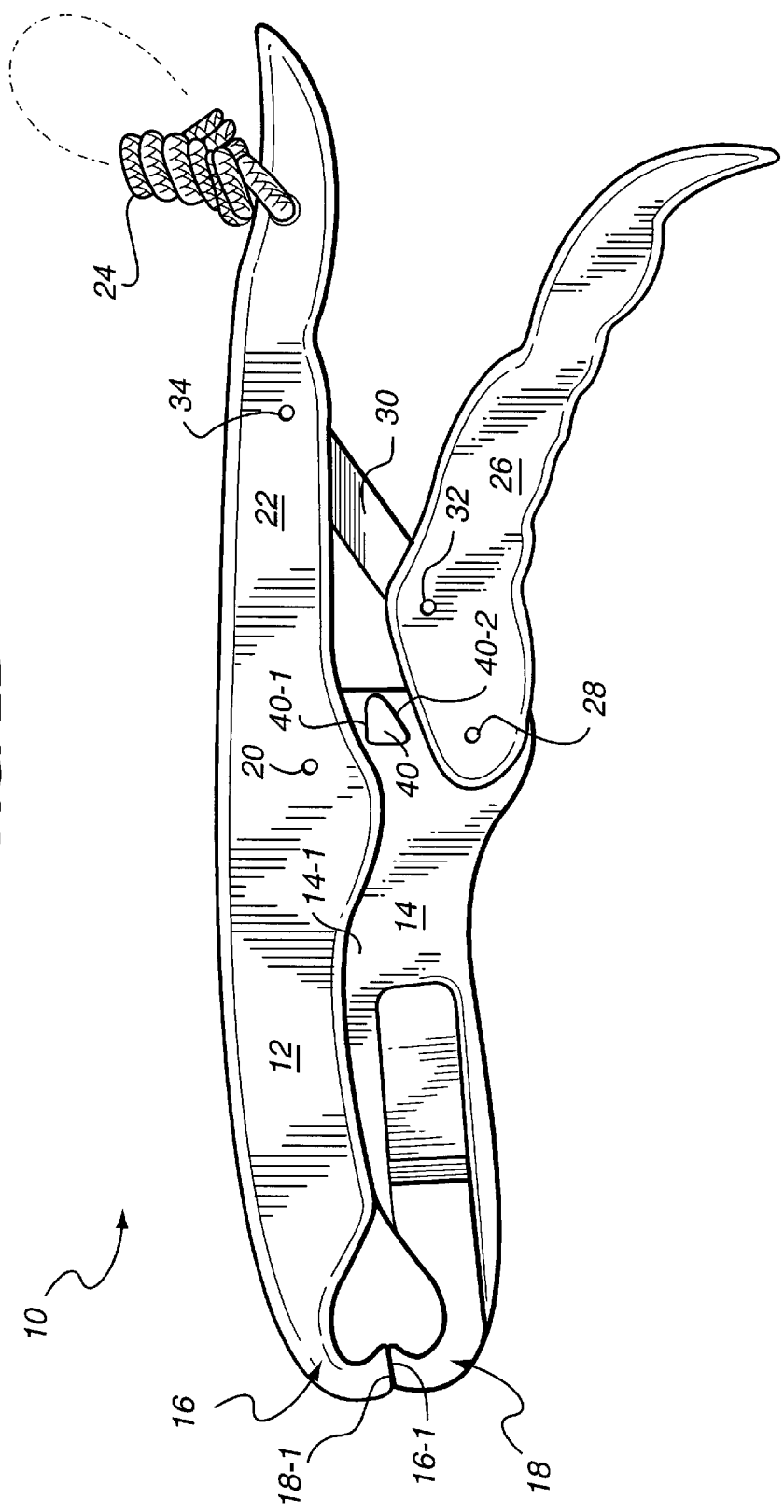
Figure 2C:
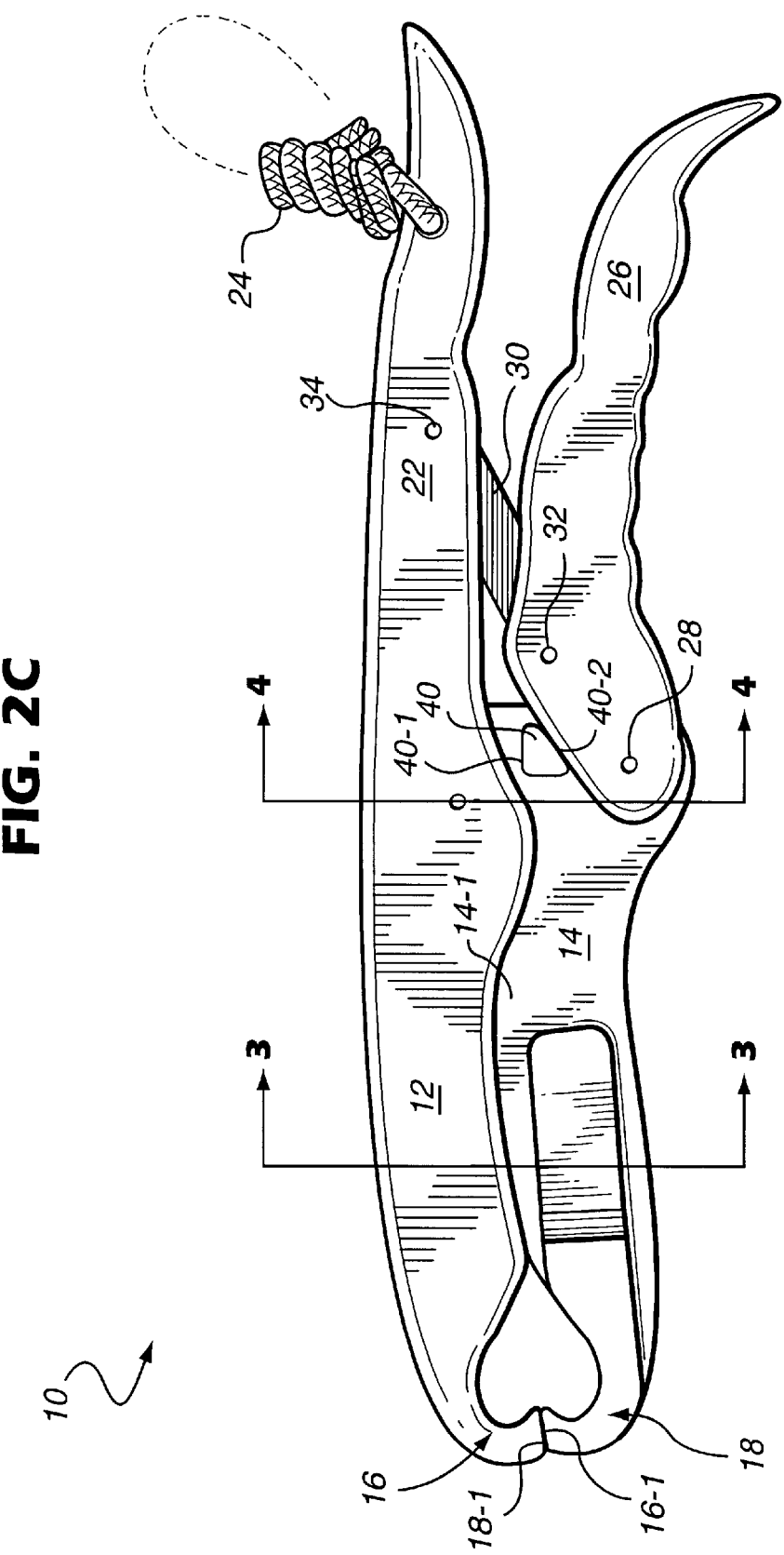
Figure 3:
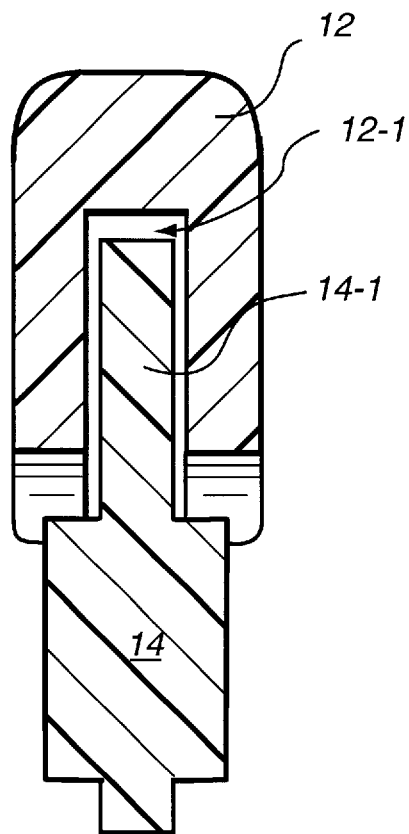
Figure 4:
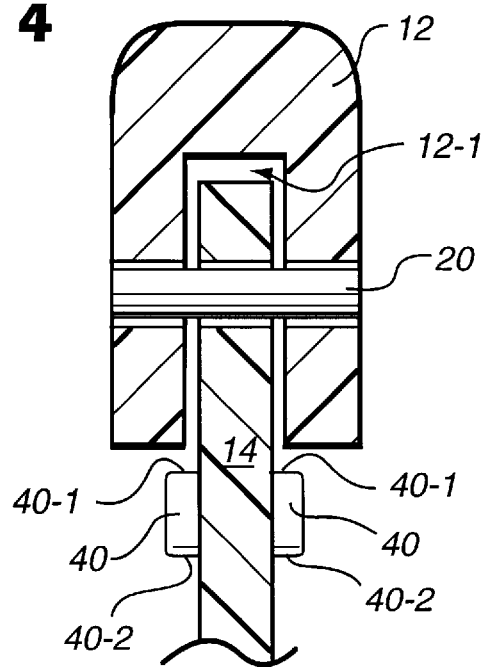

Reference will hereinafter be made to the accompanying drawings, wherein like reference numerals throughout the various FIGURES denote like structural elements, and wherein;

FIG. 1 is a perspective view showing a preferred embodiment of the fish handling pliers of the present invention in use;

FIGS. 2A–2C are each side elevational views of the fish handling pliers depicted in FIG. 1 during a sequence of operation from a fully opened condition (FIG. 2A), to an intermediate closed, but unlocked, condition (FIG. 2B) and then to a fully closed condition (FIG. 2C); and FIGS. 3 and 4 are each enlarged cross-sectional elevational views of the fish handling pliers as taken along lines 3—3 and 4—4, respectively, in FIG. 2C.

DETAILED DESCRIPTION OF THE INVENTION

One particularly preferred form of the fish handling pliers 10 according to the present invention is shown in accompanying FIG. 1. As is seen, the pliers 10 is adapted especially to grip the tissue of a fish F associated with the fishes lower mandible or lip L. This gripping action of the pliers 10 allows the mouth of the fish to be propped in an open condition to permit the fish F to be more easily handled and manipulated out of the water.

The components and their functions of the pliers 10 are perhaps more clearly depicted in accompanying FIGS. 2A–2C. In this regard, the components of the pliers 10 are most preferably formed of a plastics material that is less dense than water (i.e., so it floats if dropped overboard) but sufficient strong to be durable. The pliers 10 includes upper and lower members 12, 14 which are provided with respective downwardly and inwardly turned jaws 16, 18 at their respective forward terminal ends. The upper and lower members 12, 14 are pivotally connected to one another by a pivot axle 20 so as to allow the opposed jaws 16, 18 to be pivotally moved towards and away from one another as will be explained in greater detail below.

The rearward end of the upper member 12 is provided with an upper handle section 22 to which a lanyard 24 may be attached to allow the pliers 10 to be attached to the fisherman's wrist, for example. A lower handle section 26 is connected pivotally at its forward end to the lower member 14 via pivot axle 28. Movements of the lower handle section 26 between its opened condition (i.e., as shown in FIG. 2A) and its closed condition (i.e., as shown in FIG. 2C) will thereby responsively cause the lower member 18 to pivot between respective positions that are farther from and closer to the upper member 12. As such, the opposed jaws 16, 18 at the terminal ends of the upper and lower members 12, 14, respectively, are opened and closed relative to one another.

A toggle lever 30 extends between the upper handle section 22 of the upper member 12 and the lower handle section 26. The toggle lever 34 is pivotally connected at one of its ends to the lower handle section by pivot axle 32 rearwardly of the pivot axle 28. The other end of the toggle lever 30 is pivotally connected to the upper handle section 22 via pivot axle 34.

The toggle lever 30 and its pivotal connections to the upper and lower handle sections 22, 26 via pivot axles 34, 32, respectively, is thus an "over-the-center" assembly. That is, as is seen in FIG. 2B, when the lower handle section 26 is pivotally moved toward its closed condition, the substantially flat jaw surfaces 16-1, 18-1 of the jaws 16, 18 will be brought initially into contact with one another. At this time, the pivot axle 32 is positioned physically below an imaginary line directly joining the pivot axles 28, 34. At this time, therefore, the jaws 16, 18 are not "locked" in their closed condition. Continued pivotal movement of the lower handle section 26 toward its closed condition will thus cause the pivot axle 32 to pass "over-the-center" of the imaginary line joining the pivot axles 28, 32—that is, the pivot axle 32 will be positioned physically above such imaginary line as shown in FIG. 2C. This continued pivotal movement of the lower handle section 26 will thus cause the jaws 16, 18 to be tightly clamped together and locked in place.

The "locking" force noted above will, however, be countered when the lower handle section 26 is pivoted away from the upper handle section 22 toward its open condition. Specifically, substantial resistance against such pivotal movement will be encountered until the pivot axle 32 is once again moved "over-the-center" of the imaginary line joining the axles 28 and 34—i.e., until the lower handle section 26 is pivotally moved from the closed condition shown in FIG. 2C to the intermediate condition shown in FIG. 2B. Thereafter, continued pivotal movement of the lower handle section 26 to its opened condition will cause the jaws 16, 18 to separate from one another as depicted in FIG. 2A.

The lower member 14 most preferably has a stop boss 40 positioned between the upper and lower handle sections 22, 24, respectively. The stop boss 40 protrudes outwardly from the lower member 14 and includes convergent upper and lower surfaces 40-1, 40-2, respectively. The upper surface 40-1 contacts the upper handle section 22 while the lower surface 40-2 is spaced from the lower handle section 26 when the lower handle section is in its opened condition as shown in FIG. 2A. The upper surface 40-1 of the stop boss 40 thus establishes the maximum opened condition of the jaws 16, 18 and prevents the lower handle section 26 from being pivotally moved beyond the state shown in FIG. 2A (i.e., prevents further pivotal movement of the lower handle section 26 in the clockwise direction as viewed in FIG. 2A).

The lower surface 40-2 of the boss member 40 contacts the lower handle section 26 while the upper surface 40-1 is spaced from the upper handle section 22 when the lower handle section 26 is in its closed condition as shown in FIG. 2C. Thus, the lower surface 40-2 of the boss 40 will be in bear against the lower handle section 26 when it is pivoted to its closed condition to prevent further pivotal movements thereof in that direction (i.e., in the counter-clockwise direction as viewed in FIG. 2C).

As depicted in FIGS. 3 and 4, the lower member 14 is substantially planar while the upper member 12 has a generally U-shaped cross-section which defines a lengthwise extending groove 12-1. The lower member 14 also is provided with an integral tongue portion 14-1 which is positioned intermediate the pivot axle 20 and the lower jaw 18. The tongue portion 14-1 is likewise substantially planar and is adapted to being received within the lengthwise groove 12-1 of the upper member 12 when the lower handle section is in its closed condition. Thus, the coupling of the tongue 14-1 within the groove 12-1 when the jaws 16, 18 are closed will stabilize the upper and lower members 12, 14, and hence their respective jaws 16, 18, against relative lateral movements (e.g., which might be occasioned by movements of the fish F which is gripped thereby).

It will, of course, be appreciated that the tongue and groove could be provided on the lower and upper members, respectively—that is, opposite to that shown in the accompanying drawing FIGURES. Other equivalent arrangements will also be apparent to those skilled in this art.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Fish handling pliers comprising upper and lower members pivotally connected to one another and having respective upper and lower opposed jaws, wherein said upper and lower members have a lengthwise mated tongue and groove coupling when said upper and lower opposed jaws are in a closed condition, whereby lateral movement between said upper and lower members is resisted;

an upper handle section immovably connected to said upper member; and a lower handle section pivotally connected at a forward end thereof to a rearward end of said lower member such that pivotal movements of said lower handle section between open and closed conditions responsively pivotally moves said lower member away from and towards said upper member to open and close said opposed jaws, respectively; and wherein said lower member includes a stop boss having convergent upper and lower surfaces which respectively establish said open and closed conditions, respectively, of said lower handle section, and wherein said stop boss is positioned such that said upper surface contacts said upper handle section and said lower surface is spaced from said lower handle section when said lower handle section is in said open condition, and said lower surface contacts said lower handle section and said upper surface is spaced from said upper handle section when said lower handle section is in said closed condition, whereby pivotal movements of said lower handle section beyond said open and closed conditions is limited.

2. The fish handling pliers as in claim 1, wherein said upper member includes said groove, and said lower member includes said tongue.

3. The fish handling pliers as in claim 1, further comprising:

a toggle lever pivotally connected at one end thereof to said lower handle section rearwardly of said pivotal connection between said lower member and said lower handle section, and pivotally connected at the other end thereof to said upper member to provide an over-the-center locking assembly.

4. The fish handling pliers as in claim 1, comprising a lanyard connected to said upper member.

5. The fish handling pliers as in claim 1, wherein said upper member is generally U-shaped in cross-section to establish said groove, and wherein said lower member includes at least a section thereof rearwardly of said lower jaw which is substantially planar to establish said tongue.

6. The fish handling pliers as in claim 5, comprising a pivot axle which pivotally connects said upper and lower members, and wherein said tongue of said lower member is positioned intermediate said pivot axle and said lower jaw.

7. Fish handling pliers comprising:

an upper member having an upper handle section at a rearward end thereof, and an upper jaw at a forward end thereof;

a lower member having a lower jaw at a forward end thereof which is opposed to said upper jaw, and having a rearward end pivotally connected to said upper member to allow for pivotal movements towards and away from said upper member to thereby close and open said opposed upper and lower jaws;

said upper handle section immovably connected to said upper member; and a lower handle section pivotally connected at a forward end thereof to said rearward end of said lower member such that pivotal movements of said lower handle section between open and closed conditions responsively pivotally moves said lower member away from and towards said upper member to open and close said opposed jaws, respectively; wherein said lower member includes a stop boss having convergent upper and lower surfaces which respectively establish said open and closed conditions, respectively, of said lower handle section, and wherein said stop boss is positioned such that said upper surface contacts said upper handle section and said lower surface is spaced from said lower handle section when said lower handle section is in said open condition, and said lower surface contacts said lower handle section and said upper surface is spaced from said upper handle section when said lower handle section is in said closed condition, whereby pivotal movements of said lower handle section beyond said open and closed conditions is limited, and wherein said upper member defines a lengthwise-extending groove; and said lower member includes a lengthwise extending tongue in opposition to said groove, said tongue being seated within said groove when said upper and lower jaws are closed by movement of said lower handle section from said open condition to said closed condition thereof.

8. Fish handling pliers as in claim 7, further comprising:

a toggle lever pivotally connected at one end thereof to said lower handle section rearwardly of said pivotal connection between said lower member and said lower handle section, and pivotally connected at the other end thereof to said upper handle section to provide an over-the-center locking assembly.

9. The fish handling pliers as in claim 7, comprising a lanyard connected to said upper member.

10. The fish handling pliers as in claim 7, wherein said upper member is generally U-shaped in cross-section to establish said groove, and wherein said lower member includes at least a section thereof rearwardly of said lower jaw which is substantially planar to establish said tongue.

11. The fish handling pliers as in claim 10, comprising a pivot axle which pivotally connects said upper and lower members, and wherein said tongue of said lower member is positioned intermediate said pivot axle and said lower jaw.

* * * * *